United States Patent [19]

Handke et al.

[11] Patent Number: 5,006,694
[45] Date of Patent: Apr. 9, 1991

[54] ROBOT TYPE APPARATUS FOR PERFORMING A PLURALITY OF OPERATIONS ON A WORK PIECE

[75] Inventors: Guenther Handke, Irschenberg; Hans-Juergen Lemke, Neubiberg, both of Fed. Rep. of Germany

[73] Assignee: Messerschmitt-Boelkow-Blohm GmbH, Munich, Fed. Rep. of Germany

[21] Appl. No.: 321,226

[22] Filed: Mar. 8, 1989

[30] Foreign Application Priority Data

Mar. 8, 1988 [DE] Fed. Rep. of Germany ....... 3807476

[51] Int. Cl.[5] .............................................. B23K 26/00
[52] U.S. Cl. .............................. 219/121.6; 219/121.63; 219/121.67; 219/121.84
[58] Field of Search ............ 219/121.6, 121.85, 121.63, 219/121.64, 121.72, 121.67, 121.84

[56] References Cited

U.S. PATENT DOCUMENTS

| | | | |
|---|---|---|---|
| 2,861,166 | 11/1958 | Cargill, Jr. ..................... | 219/121.6 X |
| 4,063,063 | 12/1977 | Funck et al. ................. | 219/121.85 X |
| 4,201,905 | 5/1980 | Clark et al. ..................... | 219/121.6 |
| 4,335,296 | 6/1982 | Bredow ......................... | 219/121.7 X |

FOREIGN PATENT DOCUMENTS

| | | |
|---|---|---|
| 3601504 | 7/1987 | Fed. Rep. of Germany . |
| 0077195 | 4/1987 | Japan .............................. 219/121.83 |

Primary Examiner—C. L. Albritton
Attorney, Agent, or Firm—W. G. Fasse; D. H. Kane, Jr.

[57] ABSTRACT

A laser operation such as a laser welding operation or a laser cutting operation is improved in its quality and a consistently high quality is achieved by arranging auxiliary tool units upstream and/or downstream of a main laser tool unit including a primary laser head on a common tool carrier. The secondary tool units upstream of the laser operation are intended for a preliminary surface treatment to present the most appropriate surface conditions for the following laser operation. Similarly, the tool units arranged downstream of the laser operation are intended for subsequent work operations such as an immediate cleaning operation, a coating operation or the like to avoid a reoxidation of the welding seam or of the cut edge of the work piece. The secondary tools make sure that the laser operation is enhanced or improved either by presenting optimal conditions for the laser operation or by improving the work piece subsequent to the laser operation. The subsequent operation in this sense also results in an improved laser operation.

20 Claims, 2 Drawing Sheets

ROBOT TYPE APPARATUS FOR PERFORMING A PLURALITY OF OPERATIONS ON A WORK PIECE

FIELD OF THE INVENTION

The invention relates to a robot type apparatus for performing a plurality of operations on a work piece on one machine, whereby the main operation employs a laser for performing, for example, a welding operation and/or a cutting operation, and wherein the main operation is preceded by prior secondary operations and followed by subsequent secondary operations.

BACKGROUND INFORMATION

It is known to use a laser beam for performing the operations of welding or cutting, for example, of flat work pieces such as sheet metal and the like. The quality of such welding or cutting operations by means of a laser beam depends on several factors which must be maintained constant to assure a consistently good quality of the operations being performed. For example, in connection with sheet metal it is critical that the spacing between two sheets of sheet metal remains constant relative to each other and that the spacing between the sheet metal work pieces to be welded and the laser head also remains constant to assure a uniform laser efficiency throughout the operation. A pressure roller has been used to control the just mentioned spacings.

The quality of the surface of the work pieces also has a substantial influence on a consistently high quality of the laser operation being performed. The surface condition of the work piece influences the welding or cutting operation by the laser beam because the degree of reflection and the degree of dispersion have an influence on the operation efficiency of the laser beam generated in a laser head.

It has also been found that a surface layer on the work piece, for example, in the form of contamination, in the form of oxide layers or in the form of protective coatings adversely influence the operation quality. Such adverse influences have been noted independently of the type of coating. In other words, metallic coatings and non-metallic coatings have an adverse influence on the efficiency of the laser operation because these coatings negatively influence the heat flow from the laser beam to the point where the laser beam performs its operation.

Another problem is caused by spattered particles generated by the laser beam action. Such particles must be kept away from the point where the beam is to be effective and they must also be kept away from the surface after the laser beam has been effective so that the work piece is suitable for further operations and use. The removal of these spattered particles requires respective operations upstream of the laser beam action and also downstream of the laser beam action as viewed in the direction of relative movement between the laser beam and the work piece. The several working operations have been performed heretofore on different machines requiring repeated handling of the work piece, which is not cost efficient.

Repeated handling of the work piece is time consuming and hence expensive. Additionally, such handling exposes the work piece to repeated contamination not only by deposition of dirt, but also by a new oxide formation on the surface of the work piece, thereby adversely affecting the laser operation.

OBJECTS OF THE INVENTION

In view of the foregoing it is the aim of the invention to achieve the following objects singly or in combination:

to avoid the above mentioned drawbacks by improving a robot type apparatus employing a laser head in such a way that automatically the surface quality is consistently suitable for an efficient laser operation to achieve a high welding quality or a high cutting quality;

to prepare a work piece surface, whether it is coated or uncoated, for a laser operation immediately prior to the laser operation on the same apparatus;

to assure a fault-free surface subsequent to the laser operation by removing any spattered particles to make the surface of the work piece ready for any further treatment or surface of the work piece ready for any further treatment or operation subsequent to the laser operation;

to properly treat a surface of a work piece just prior to a laser operation and directly after a laser operation, both on the same apparatus, to provide optimal surface conditions on the one hand for the laser operation and on the other hand for any subsequent operations to be performed on the work piece surface; and to combine a plurality of tools in a single tool carrier upstream of a laser tool and/or other plurality of tools in the same carrier downstream of the laser tool for performing respective operations upstream and/or downstream of the laser tool on the same work piece that is moved relative to the tool carrier or relative to which the tool carrier is being moved.

SUMMARY OF THE INVENTION

The tool carrier according to the invention is characterized in that it carries a laser head suitable for a welding or a cutting operation. The laser head is arranged approximately centrally of the carrier so that additional tool means for preliminary automatic operations and/or for subsequent automatic operations are arranged upstream and downstream of the laser head. These tool means including the laser head are controllable in an open-loop or closed loop fashion. Thus, the term control or any related team as used herein is intended to encompass an open loop control and/or a closed loop control as required for any particular purpose. A thermal unit, a cleaning unit, and a gas flow unit are arranged upstream of the laser head as viewed in a relative movement direction between the laser head, and a work piece. Upstream in this context means that the thermal unit, the cleaning unit, and the gas flow unit become effective on the work piece surface in that order and prior to the operation of the laser head. Downstream of the laser head there are arranged, for example, a covering unit, a coating unit and, another thermal unit. Any downstream unit in this context becomes effective subsequent to the laser operation. The number and sequence of upstream and downstream units may vary in accordance with specific requirements.

A thermal unit may, for example, be employed upstream and/or downstream for treating a coating on the work piece surface, for example, for curing the coating.

A cleaning unit may comprise a brush for cleaning the surface of the work piece. A gas flow unit may blow a gas jet onto the surface of the work piece or it may be a suction device for removing particles loosened by the operation of a preceding brush. The operation of each of the tool units is controllable for its intended purpose, as mentioned, in a closed and/or open loop manner.

The advantages of the invention are seen primarily in that it is now possible to treat a work piece in a cost effective manner in a single sequence of operations that are performed automatically, for example, for removing a surface coating and/or cleaning a surface coating prior to a laser welding or cutting operation, whereupon the welded seam or the cut is immediately coated again and the coating may be treated in any required manner. The sequence of these operations is automatically controllable. The sequence itself may be changed depending on requirements. A feed advance control is provided either for the work pieces or for the tool carrier or for both the tool carrier and the work pieces. Thus, each operation can be controlled in accordance with the particular quality requirements applicable to that particular operation. Any corrections required in the control can be automatically made in response to signals received from sensors that monitor the work zones. Each unit is individually controllable for an optimal efficiency in such a way that a rapid, yet high quality laser welding or laser cutting can be obtained followed by a new coating of high quality on the work piece surface.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
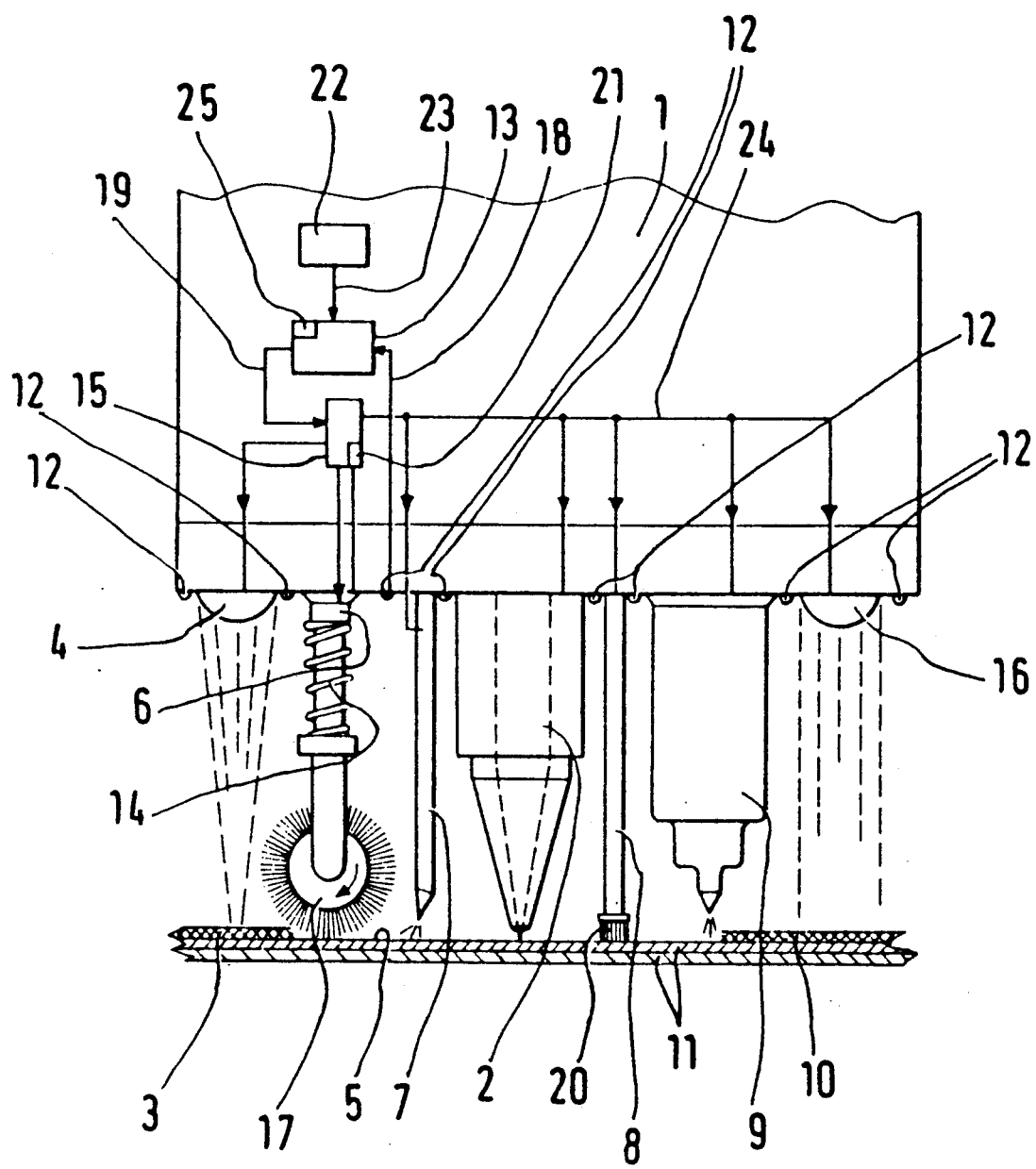
FIG. 1 is a schematic side view of one embodiment of a tool carrier with several tools or tool units arranged according to the invention.

FIG. 1 shows a tool carrier 1 carrying in addition to a laser head 2, which is arranged approximately centrally of the carrier, a plurality of other tool units. Three tool units 4, 6, and 7, are arranged upstream of the laser head 2. In other words, these tool units become effective prior to any operation of the laser head 2 in the stated sequence 4, 6, 7. Three further tool units 8, 9, and 16 are arranged downstream of the laser head 2 and hence become effective subsequent to any operation by the laser head 2 also in the stated sequence 8, 9, 16.

The thermal unit 4 arranged upstream of the laser head 2 is as such of known construction. It is, for example, tiltable and can be focussed for applying heat to a well defined zone. The thermal unit 4 may, for example, be an infrared radiator, alternately it may be a laser head, or it may be a nozzle that applies a cold or hot gas to the surface of the work piece 11. Any heating device may be suitable to take the place of the unit 4. As shown, the unit 4 is a heat radiator for softening the work piece prior to the operation of the laser head 2. In another embodiment the unit 4 may blow a very cold gas jet onto the surface to make it brittle along a path impinged by the cold gas jet. In the shown embodiment the radiator of the unit 4 softens the coating 3 to facilitate its removal by a brush 17 of the cleaning unit 6. The thermal unit 4 may provide a chemically clean surface area 5 on the work piece 11.

Downstream of the thermal unit 4 there is the mechanical cleaning unit 6 for removing the coating 3 or for removing any other contaminations from the surface 5 or even to polish the surface 5. The cleaning unit 6 may carry other tools than the shown brush 17. For example, the rotatable brush could be replaced by a grinding or polishing disk, by a stylus, by a tiltable ball or sand blaster, or by any tiltable steam jet or liquid jet applicator. Thus, for simplicity's sake the brush 17 is intended to symbolically represent any of the just mentioned cleaning tools.

The work pressure by which the brush 17 is applied to the work piece surface is determined, for example, by a spring 14 which is preferably exchangeable. Instead of an exchangeable spring 14, the work pressure may be adjusted automatically, for example, by a piston cylinder device or similar power unit 15, that is automatically controllable to exert the desired work pressure in response to specific instantaneous requirements as will be described in more detail below.

The operation of the tool attached to the unit 6, for example, the rotation of the brush 17, is controlled by a conventional electrical or pneumatic drive 21 which in turn is controlled by control mean to be described below.

A gas flow unit 7 which may be blowing a gas jet onto the work piece surface or which may be a suction device, is arranged downstream of the cleaning unit 6. The lower end of the gas flow unit 7 carries a directed nozzle at the end of a tiltable pipe or a flexible hose connected in a conventional manner to a gas source or pump or with a container for the required gas. The gas flow unit removes any particles remaining after the operation of the units 4 and 6. The unit 7 may be effective by blowing these particles away or by sucking them away. The unit 7 also cooperates with the cleaning brush 17 by facilitating the removal of material that has been loosened or brushed off by the brush.

As a result of the just described operations of the units 4, 6, and 7, the surface 5 of the work piece 11 has been prepared for an optimal efficiency of the operation of the laser head 2 for assuring a laser operation of high quality, be it a laser welding or a laser cutting operation.

A surface covering unit 8 that is pressure operable, is arranged directly downstream of the laser head 2 for covering of the work piece surface immediately next to the surface area on which the laser beam is effective for avoiding a mixing of spattered particles caused by the laser operation, with the material of the coating 10 to be formed after the laser operation. A brush 20 can be used for this covering operation. It has been found that a brush provides a completely effective covering. A coating unit 9 known as such is arranged downstream of the covering unit 8. The coating unit 9 forms a new surface coating 10 on the surface of the work piece 11 for effectively avoiding the formation of oxide layers on the surface that was subjected to the laser beam action.

A second thermal unit 16 is arranged downstream of the coating unit 10 for treating, for example, curing the freshly formed coating 10. The thermal unit 16 may, for example, be of the same construction as the unit 4. An infrared unit is suitable for curing.

Referring further to FIG. 1, there are provided means for controlling the work sequences of the individual described units or of the entire set of work units including the units 4, 6, 7, 2, 8, 9, and 16 and for also controlling the feed advance of the work piece 11 and/or of the carrier 1. Such control is accomplished by a conventional control unit 13 operatively connected at 19 to an also conventional electrical, or pneumatic, or hydraulic power drive unit 15. The control unit 13 has an input 18 or rather a plurality of inputs 18 individually connected to sensors 12, for example photosensors, which sense the effect of the individual work performing units 4, 6, and so forth. The control unit 13 has another input 23 connected to a memory 22. The control unit 13 further includes a computer 25 with a keyboard which performs the required program steps in response to the inputs 18 and 23.

The control unit 13 controls the power and operating unit 15 through the connection 19 in accordance with the individual requirements such as radiation heat, brush pressure, blowing pressure, and so forth. These individual requirements in the form of respective signals are provided by the sensors 12 and by the memory 22. Additionally, the unit 13 controls the feed advance of the carrier 1 relative to the work piece or vice versa, as mentioned.

The electrical or pneumatic drive 21 for the movement and/or rotation of the cleaning unit 6, for example, of the brush 17, is also controlled by the control unit 13 in accordance with different cleaning requirements that may depend on the type of work piece.

Normally, the required power output data which depend on the type of work piece used, and on the condition, especially the surface condition of the work piece, are present in the memory 22 and supplied to the control unit 13, or rather to its computer 25, through the data bus 23. Generally, the memory 22 has stored therein all typical work piece characteristics and conditions or these data may be entered through the computer keyboard. Thus, the control of the work sequence to be performed by the units 4, 6, 7, 2, 8, 9, and 16 and/or the feed advance are automatically controllable. Incidentally, at least one sensor 12 will be provided for each unit 4, 6, 7, 2, 8, 9, and 16 and each will be individually connected to the control unit 13, although only one conductor 18 is symbolically shown in FIG. 1.

The computer 25 in the control unit 13 continuously compares the measured signals received from the sensor 12 with the rated signals from the memory 22. The computer then uses the signals resulting from the continuous comparing for activating the control unit 13. This control is important because with the aid of the sensors it is possible to immediately sense a substandard work quality which can be instantly corrected. For example, the sensor or sensors which monitor the surface area 5 next to the cleaning unit 6 and the air flow unit 7 can signal the presence of coating particles on the surface 5, causing an unsatisfactory performance of the laser head 2. In that case the respective cleaning operation and particle removal operation can be improved for automatically correcting the laser efficiency. As a result, the invention achieves a consistently high quality welding of two sheet metals or a cutting operation of such sheet metals with a subsequent new coating along the welded seam or along the cut edges. This high quality can be maintained even in an assembly line type operation.

Figure 2:
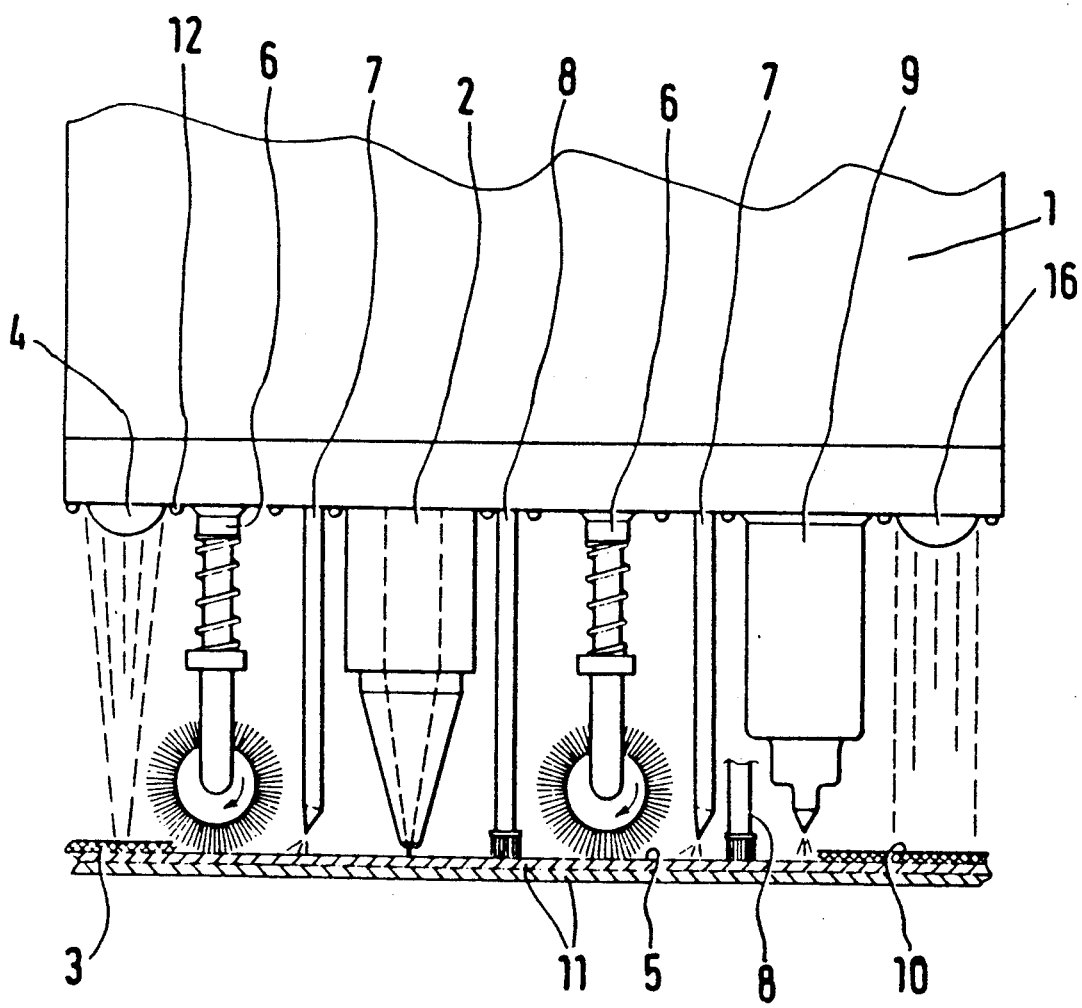
FIG. 2 is a view similar to that of FIG. 1, but showing a different arrangement of tool units downstream of the laser head.

FIG. 2 is a modification of FIG. 1 which is controllable in the same manner as the apparatus of FIG. 1. However, in FIG. 2 additional work units are provided downstream of the laser head 2. Upstream of the laser head 2, the same units 4, 6, and 7 are arranged as in FIG. 1. Downstream of the covering unit 8 there is arranged a further cleaning unit 6 and an air flow unit 7 followed by still another covering unit 8 followed by the coating unit 9 which in turn is followed by the thermal unit 16 for curing the newly formed coating 10. This type of arrangement will be employed where the operation of the laser head 2 causes an especially substantial soiling due to the production of a large number of spattered particles on the surface 5. This system is also suitable where it is necessary to provide a highly cleaned surface, for example, where highly sensitive coating operations are employed downstream of the special cleaning operations that can be performed with the sequence of work units shown in FIG. 2.

The sequence of units 4, 6, 7, 2, 8, 9, and 16 as shown in FIG. 1 and the sequence shown in FIG. 2 are intended to be examples only and it is within the present teaching to change the sequence of work units or to employ such units only upstream or only downstream of the laser head.

Although the invention has been described with reference to specific example embodiments, it will be appreciated that it is intended to cover all modifications and equivalents within the scope of the appended claims.

What we claim is:

1. A robot type apparatus for performing a plurality of operations on a work piece, comprising main laser tool means for performing a primary operation with a laser beam, a first set of auxiliary tool means for performing secondary operations on said work piece prior to said primary operation, a second set of auxiliary tool means for performing secondary operations on said work piece subsequent to said primary operation, tool carrier means for supporting said main laser tool means for said primary operation and for supporting said first and second set of auxiliary tool means in such positions on said tool carrier means relative to said main laser tool means that said secondary operations can be performed to enhance or improve said primary operation, said apparatus further comprising control means for controlling the operation of said main laser tool means and said first and second sets of auxiliary tool means in a closed loop or open loop manner, drive means (15) connected to said control means for operating said main laser tool means and said first and second sets of auxiliary tool means in response to said control means, sensor means (12) arranged for sensing a surface condition on a work piece surface next to the respective auxiliary tool means to provide control signals for said control means, wherein said control means comprise a memory (22) and a computer (25) for operating said main laser tool means and said first and second sets of auxiliary tool means in response to control values stored in said memory and in response to said control signals provided by said sensor means (12), and for controlling a relative motion between said tool carrier means and said work piece.

2. The apparatus of claim 1, wherein said first set of auxiliary tool means comprises secondary tool units (4, 6, 7) arranged on said tool carrier means (1) upstream of said main laser tool means (2) as viewed relative to a motion between a work piece (11) and said tool carrier means (1) so that said secondary tool units become effective prior to said primary operation.

3. The apparatus of claim 2, wherein said secondary tool units comprise a thermal unit (4), a mechanical cleaning unit (6, 17), and a gas flow unit (7) arranged in that order upstream of said main laser tool means (2).

4. The apparatus of claim 1, wherein said second set of auxiliary tool means comprises further secondary tool units (8, 9, 16) arranged on said tool carrier means (1) downstream of said main laser tool means (2) as viewed relative to a motion between a work piece (11) and said tool carrier means (1) so that said secondary tool units become effective subsequent to said primary operation.

5. The apparatus of claim 4, wherein said further secondary tool units (8, 9, 16) comprise a covering unit (8), a coating unit (9), and a further thermal unit (16) for treating a newly formed coating (10) on a work piece surface (5), said secondary tool units being arranged in that order.

6. The apparatus of claim 4, wherein said further secondary tool units comprise downstream of said main laser tool means (2) a covering unit (8), a cleaning unit (6), a gas flow unit (7), another covering unit (8), a coating unit (9), and a thermal unit (16) arranged in that order.

7. The apparatus of claim 1, wherein said auxiliary tool means comprise at least one tiltable thermal unit which is capable of being focussed.

8. The apparatus of claim 1, wherein said auxiliary tool means comprise at least one cleaning unit including a cleaning tool capable of functioning as a stationary tool, or as a movable tool, as or a rotatable tool.

9. The apparatus of claim 1, wherein said auxiliary tool means comprise at least one gas flow unit forming a blowing unit.

10. The apparatus of claim 1, wherein said auxiliary tool means comprise at least one gas flow unit forming a suction device.

11. The apparatus of claim 1, wherein said auxiliary tool means comprise a mechanical cleaning unit including a power drive controlled by said control means.

12. The apparatus of claim 1, wherein said auxiliary tool means comprise a cleaning unit including a cleaning tool and an exchangeable spring for exerting a predetermined work pressure through said cleaning tool on said work piece.

13. A robot type apparatus for performing a plurality of operations on a work piece, comprising main laser tool as for performing a primary operation with a laser beam auxiliary tool means for performing secondary operations on said work piece, tool carrier means for supporting said main laser tool means for said primary operation and for supporting said auxiliary tool mear: in such positions on said tool carrier means relative to said main laser tool means that said secondary operations can be performed to enhance or improve said primary operation, wherein said auxiliary tool means comprises secondary tool units (4, 6, 7) arranged on said tool carrier means (1) upstream of said main laser tool means (2) as viewed relative to a motion between a work piece (11) and said tool carrier means 91) so that said secondary tool units become effective prior to said primary operation, and wherein said secondary tool units comprise a thermal unit (4), a mechanical cleaning unit (6, 17), and a gas flow unit (7) arranged in that order upstream of said main laser tool means.

14. The apparatus of claim 13, wherein said auxiliary tool means comprise further secondary tool units (8, 9, 16) arranged on said tool carrier means (1) downstream of said main laser tool means (2) as viewed relative to a motion between a work piece (11) and said tool carrier means (1) so that said further secondary tool units become effective subsequent to said primary operation.

15. The apparatus of claim 14, wherein said further secondary tool units (8, 9, 16) comprise a covering unit (8), a coating unit (9), and a further thermal unit (16) for treating a newly formed coating (10) on a work piece surface (5), said further secondary tool units being arranged in that order.

16. The apparatus of claim 14, wherein said further secondary tool units comprise downstream of said main laser tool means (2) a covering unit (8), a cleaning unit (6), a gas flow unit (7), a further covering unit (8), a coating unit (9), and a thermal unit (16) arranged in that order.

17. The apparatus of claim 14, wherein at least one of said thermal units (4, 16) is a tiltable thermal unit which is capable of being focussed.

18. The apparatus of claim 13, wherein said mechanical cleaning unit comprises a cleaning tool capable of functioning as a stationary tool, or as a movable tool, or as a rotatable tool.

19. The apparatus of claim 13, wherein said gas flow unit forms a blowing unit.

20. The apparatus of claim 13, wherein said gas flow unit forms a suction device.

* * * * *

UNITED STATES PATENT AND TRADEMARK OFFICE
CERTIFICATE OF CORRECTION

PATENT NO. :   5,006,694
DATED      :   April 9, 1991
INVENTOR(S):   Guenther Handke et al.

It is certified that error appears in the above-identified patent and that said Letters Patent is hereby corrected as shown below:

In Claim 13, Column 7, line 48, replace "tool as" by
             --tool means--;
             Column 8, line 1, after "beam" insert --,--;
             Column 8, line 12, replace "91)" by --(1)--.

Signed and Sealed this

Twenty-eighth Day of July, 1992

Attest:

DOUGLAS B. COMER

Attesting Officer          Acting Commissioner of Patents and Trademarks